United States Patent [19]
Heukensfeldt Jansen

[11] Patent Number: 6,051,837
[45] Date of Patent: Apr. 18, 2000

[54] GAMMA CAMERA STABILIZER

[75] Inventor: Floribertus P. M. Heukensfeldt Jansen, Brookfield, Wis.

[73] Assignee: General Electric Company, Milwaukee, Wis.

[21] Appl. No.: 09/400,598

[22] Filed: Sep. 21, 1999

Related U.S. Application Data

[62] Division of application No. 09/001,568, Dec. 31, 1997.
[51] Int. Cl.[7] .................................................. G01T 1/208
[52] U.S. Cl. .............................. 250/363.09; 250/363.03; 250/363.07
[58] Field of Search ....................... 250/363.09, 363.03, 250/363.07

[56] References Cited

U.S. PATENT DOCUMENTS

| | | | |
|---|---|---|---|
| 5,449,897 | 9/1995 | Bertelsen et al. | 250/363.09 |
| 5,677,536 | 10/1997 | Vickers | 250/363.09 |

*Primary Examiner*—Constantine Hannaher
*Assistant Examiner*—Andrew Israel
*Attorney, Agent, or Firm*—Quarles & Brady; Christian G. Cabou; Phyllis Y. Price

[57] ABSTRACT

A method for identifying PMT drift in an edge PMT of a gamma camera, where said gamma camera includes a plurality of PMTs arranged in an array. The central point of said array generates an intensity signal M during a flood procedure and a field of view edge blocks a portion of the edge PMT. The PMT intensity profile changes due to the blocked PMT portion and contains a first point at which the intensity level is N, where N is a fraction of M.

3 Claims, 8 Drawing Sheets

| 200 | 200 | 200 | 200 | 200 | 200 | 200 | 200 |
|-----|-----|-----|-----|-----|-----|-----|-----|
| 202 | 202 | 200 | 200 | 200 | 200 | 200 | 200 |
| 200 | 200 | 200 | 200 | 200 | 200 | 200 | 200 |
| 202 | 202 | 200 | 200 | 200 | 200 | 202 | 201 |
| 200 | 200 | 201 | 201 | 201 | 201 | 201 | 200 |
| 200 | 201 | 200 | 200 | 200 | 200 | 200 | 200 |

| 0 | 0 | 0 | 0 | 0 | 0 | 0 | 0 |
|---|---|---|---|---|---|---|---|
| -22 | -22 | -40 | -40 | -40 | -40 | -40 | -40 |
| -40 | -60 | -60 | -40 | -60 | 0 | 0 | 0 |
| -6 | -6 | -2 | -2 | 0 | 0 | -4 | -3 |
| 0 | 0 | 3 | 3 | 7 | 7 | -3 | 0 |
| 0 | -7 | -2 | 0 | 0 | 0 | 0 | 0 |

| 0 | 0 | 0 | 0 | 0 | 0 | 0 | 0 |
|---|---|---|---|---|---|---|---|
| −0.109 | −0.109 | −0.2 | −0.2 | −0.2 | −0.2 | −0.2 | −0.2 |
| −0.2 | −0.3 | −0.3 | −0.2 | −0.3 | 0 | 0 | 0 |
| −0.03 | −0.03 | −0.01 | −0.01 | 0 | 0 | −0.02 | −0.015 |
| 0 | 0 | 0.0149 | 0.0149 | 0.0348 | 0.0348 | −0.015 | 0 |
| 0 | −0.035 | −0.01 | 0 | 0 | 0 | 0 | 0 |

Di VECTORS = (Hi−Li)/(Hi+Li)

FIG. 10

| 0 | 0 | 0 | 0 | 0 | 0 | 0 | 0 |
|---|---|---|---|---|---|---|---|
| −0.007 | −0.007 | −0.012 | −0.012 | −0.012 | −0.012 | −0.012 | −0.012 |
| −0.012 | −0.018 | −0.018 | −0.012 | −0.018 | 0 | 0 | 0 |
| −0.002 | −0.002 | −6E−04 | −6E−04 | 0 | 0 | −0.001 | −9E−04 |
| 0 | 0 | 0.0009 | 0.0009 | 0.0021 | 0.0021 | −9E−04 | 0 |
| 0 | −0.002 | −6E−04 | 0 | 0 | 0 | 0 | 0 |

DNi*Ai* DAMPING FACTOR (ASSUMING Ai=0.1, DAMPING=0.6)

FIG. 11

| 0.0 | 0.0 | 0.0 | 0.0 | 0.0 | 0.0 | 0.0 | 0.0 |
|---|---|---|---|---|---|---|---|
| −13.1 | −13.1 | −24.0 | −24.0 | −24.0 | −24.0 | −24.0 | −24.0 |
| −24.0 | −36.0 | −36.0 | −24.0 | −36.0 | 0.0 | 0.0 | 0.0 |
| −3.6 | −3.6 | −1.2 | −1.2 | 0.0 | 0.0 | −2.4 | −1.8 |
| 0.0 | 0.0 | 1.8 | 1.8 | 4.2 | 4.2 | −1.8 | 0.0 |
| 0.0 | −4.2 | −1.2 | 0.0 | 0.0 | 0.0 | 0.0 | 0.0 |

ΔGe (ASSUMING ORIGINAL Ge IS 2000)

FIG. 12

| 2000.0 | 2000.0 | 2000.0 | 2000.0 | 2000.0 | 2000.0 | 2000.0 | 2000.0 |
|---|---|---|---|---|---|---|---|
| 2013.1 | 2013.1 | 2024.0 | 2024.0 | 2024.0 | 2024.0 | 2024.0 | 2024.0 |
| 2024.0 | 2036.0 | 2036.0 | 2024.0 | 2036.0 | 2000.0 | 2000.0 | 2000.0 |
| 2003.6 | 2003.6 | 2001.2 | 2001.2 | 2000.0 | 2000.0 | 2002.4 | 2001.8 |
| 2000.0 | 2000.0 | 1998.2 | 1998.2 | 1995.8 | 1995.8 | 2001.8 | 2000.0 |
| 2000.0 | 2004.2 | 2001.2 | 2000.0 | 2000.0 | 2000.0 | 2000.0 | 2000.0 |

NEW Ge

FIG. 13

GAMMA CAMERA STABILIZER

CROSS-REFERENCE TO RELATED APPLICATIONS

This is a divisional of U.S. patent application Ser. No. 09/001,568 filed on Dec. 31, 1997 entitled "Gamma Camera Stabilizer".

STATEMENT REGARDING FEDERALLY SPONSORED RESEARCH OR DEVELOPMENT

Not applicable.

BACKGROUND OF THE INVENTION

The present invention relates to gamma cameras and more particularly to a method and apparatus for identifying gamma camera photo multiplier tube gain errors and compensating for those errors.

Single photon emission computed tomography (SPECT) examinations are carried out by injecting a dilution marker comprising a compound labeled with a radiopharmaceutical into the body of a patient to be examined. A radiopharmaceutical is a substance that emits photons within a known range of energy levels about a principal energy level. For the purposes of this explanation the principal energy level will be referred to herein as level Z. By choosing a compound that will accumulate in an organ to be imaged, compound concentration, and hence radiopharmaceutical concentration, can be substantially limited to an organ of interest.

While moving through a patient's blood stream the marker, including the radiopharmaceutical, becomes concentrated in the organ to be imaged. By detecting the number of photons having energies that approximate primary energy level Z (e.g. are within plus or minus 10% of level Z) which the organ emits, organ characteristics, including irregularities, can be identified.

To identify photons having energy levels at approximate level Z, a planar gamma camera is used. A gamma camera consists of a collimator, a scintillation crystal and a plurality of photomultiplier tubes (PMTs). A stand supports the detector in a single position with respect to a patient. The collimator typically includes a lead block with tiny holes therethrough which define preferred photon paths. The preferred paths are usually unidirectional and perpendicular to the length of the collimator. The collimator blocks emissions toward the crystal along non-preferred paths.

The scintillation crystal is positioned adjacent the collimator on a side opposite the patient and within a prescribed field of view. The crystal absorbs photons that pass through the collimator on a front surface and emits light from a back surface each time a photon is absorbed. The amount of light emitted from the back surface is proportional to the impacting photon's energy level. For the purposes of this explanation, a photon absorbed by a crystal and emitting light will generally be referred to as an event or a light emitting event and the point of photon impact on the crystal will be referred to as an impact point.

The PMTs are positioned adjacent the crystal and on a side of the crystal opposite the collimator. The portion of each PMT facing the crystal includes a surface area A and will be referred to herein as the PMT face. Light emitted by the crystal passes through the PMT faces and is detected by the PMTs which generate analog intensity signals. When a single photon is absorbed by the crystal, the emitted light is typically absorbed by several different PMTs such that several PMTs generate intensity signals simultaneously, each intensity signal proportional to the amount of light detected and to an internal PMT gain factor Gi associated with the generating PMT. Preferably, all internal gain factors Gi are essentially identical.

A processor receives the intensity signals and deciphers the signals to generate data which can be used by the processor to form an emission image corresponding to the specific camera position. During deciphering, intensity signals corresponding to each event are deciphered in an effort to precisely determine where within the surface area A of a single PMT the event occurred. In addition, intensity signals corresponding to each event are combined to identify a photon energy corresponding to the specific event. Only events having energies within a specific range (i.e. the range of the radiopharmaceutical) are used for imaging. Once all locations of individual events within the desired energy range have been identified, the processor can use the precise locations to create an image of the organ of interest.

Consistent camera operation over time is an important imaging system criterion. To this end, if a specific photon pattern which is directed at a gamma camera generates a specific image during a first imaging period, during any subsequent imaging period when the specific photon pattern is again directed at the same camera, the camera should generate the same image.

Many gamma camera systems require, and the laws in many jurisdictions even dictate, that quality control processes be performed to generally track camera operation. One essentially standard quality control process which is often performed on a daily basis comprises using either an extrinsic or intrinsic photon source to direct an essentially uniform flux of photons toward a camera's scintillation crystal during a quality control test period. The essentially uniform flux of photons is often referred to as a "flood" and the method described herein will be referred to hereinafter as the "flood method". During the flood method, events having photon energies within a window of interest are identified and form an imaging set. Typically the window of interest will be a 20% on-peak acquisition meaning that only events having energy levels within ±10% of a primary energy level Z (e.g. 122 keV for 57-CO) are included in the set.

A processor uses the imaging set generated by the 20% on-peak acquisition to generate an image, performs a quantitative evaluation of the image and provides general trend information about image degradation. The image can also be provided to a technician for viewing. Thus, this process can be used to generally identify inconsistent camera operation.

Unreliable PMTs are a primary cause of inconsistent camera operation. More specifically, internal PMT gain factors Gi which vary over time result in inconsistent camera operation. Thus, over time, each PMT within a camera array may become "high", meaning that the PMT's internal gain factor Gi has increased or, in the alternative, may become "low", meaning that the PMT's internal gain factor Gi has decreased. A change in gain factor Gi is often referred to as "drift". Drift can result in image irregularities and therefore must be minimized.

Unfortunately, while the flood method can be used to identify general trends in image degradation, the flood method is relatively ineffective for identifying lesser, albeit still image degrading, amounts of drift. For example, assume that one PMT within an array has drifted and its gain is 5% greater than when it was originally installed in the array. The image generated using the flood method treats all photons having energy levels within the 20% on-peak acquisition range identically. In this case the 20% on-peak acquisition image will indicate very little error as essentially all of the intensity signal will remain within the 20% on-peak acquisition range. This is because most signal energy is at approximately primary level Z the energy spectrum about level Z being shaped somewhat like a bell curve. Thus, a PMT having a gain which is 5% greater than its initial value might only show a 0.2% change in the flood image which would be difficult to identify.

One solution to the drift problem is to identify drift and compensate therefor electronically. Several drift correction methods identify drift by relying on either a built-in reference light source or an external light source. According to these methods, new gamma cameras are subjected to either an external or an internal light source. The light source is used to direct a known photon pattern toward the scintillation crystal and the camera generates a first imaging set related thereto. The first set is stored. The camera is then used during conventional imaging procedures.

Periodically, during quality control procedures, the source is again used to direct the known photon pattern toward the crystal and the camera generates another imaging set. The second set is provided to a processor and compared to the first set to determine if any of the internal gains Gi have drifted.

To correct for drift, an adjustable external PMT gain module is provided for each PMT. As the name implies, each gain module can be used to increase or decrease an external gain factor Ge to compensate for increases or decreases in the internal gain factor Gi. For example, assuming a linear relationship between drift and an external gain factor Ge, where the internal gain factor Gi has decreased by 5%, an external gain factor Ge associated therewith can be increased by 5% to compensate. These gain modules are typically provided in software accessible only by trained technicians and not accessible by imaging personnel. Thus, recalibration typically can only be achieved by a skilled technician.

While these drift correction methods can minimize the effects of PMT drift, they have several important shortcomings. First, any method which relies on a reference photon source to consistently generate a known photon pattern is only as good as the reference source. With these methods the problem of minimizing the effects of drift becomes the problem of ensuring reference stability. While ensuring reference stability is typically easier than ensuring PMT stability, ensuring reference stability is a relatively expensive task.

Second, because a trained technician is usually required to adjust external gain factors Ge, the process identified above is typically not performed as often as it should be. In these cases, drift can affect image quality and even cause system downtime if drift becomes to great.

For these reasons, it would be advantageous to have an apparatus and method for use with a gamma camera for automatically identifying individual PMT drift without the need for a stabilized reference source. In addition, it would be advantageous to have such an apparatus which could perform drift analysis during a standard quality control procedure so that a separate procedure could be avoided. Moreover, it would be advantageous if the apparatus could automatically adjust PMT gain as a function of identified drift.

BRIEF SUMMARY OF THE INVENTION

The present invention includes a method for identifying PMT drift during a quality control procedure without requiring a stabilized reference source. To this end, during a flood procedure wherein a single on-peak acquisition image is to be generated for qualitative evaluation, instead of generating a single image, two images are generated which can be used together to (1) identify individual PMT drift and to (2) provide the single on-peak acquisition image.

The two images include an upper image and a lower image. To generate the upper and lower images the on-peak acquisition range is divided into upper and lower event energy ranges. The upper range includes an upper event set including events having energies within an upper half of the on-peak acquisition range while the lower range includes a lower event set including events having energies within a lower half of the on-peak acquisition range. The upper event set is used to generate the upper image while the lower event set is used to generate the lower image. By adding the upper and lower images the single on-peak acquisition image is generated. Drift can be identified by comparing the upper and lower images.

It has been recognized that during an on-peak acquisition in an ideal situation where internal PMT gain factors Gi are correct, there should be identical numbers of events in the upper and lower event sets. In other words, half of the events should have energies within the upper half of the on-peak acquisition range and half of the events should have energies in the lower half of the on-peak acquisition range.

When a PMT drifts, the balance between the upper and lower event sets is disrupted. When a PMT drifts high (i.e. internal gain Gi has increased), the upper event set will include more than half of the total events. Similarly, when a PMT drifts low (i.e. internal gain Gi has decreased), the lower event set will include more than half of the total events. Thus, PMT drift can be identified by comparing the number of events in the upper and lower event sets.

Comparing the number of events in the upper and lower event sets for regions of the images which correspond to each separate PMT, a quantitative error can be generated indicating the internal gain Gi error for each separate PMT. Thus, the present invention can be used to identify individual PMT drift during a conventional quality control flood procedure and in a manner which is essentially transparent to a system user and which does not require a user to perform an additional procedure.

Importantly, the present invention does not require a photon source which generates the same photon flux over time. In this case, the source can be relatively non-uniform over time and the difference between the first and second images will still be useable to identify drifting PMTs.

In addition, after PMT drift has been identified, the invention also contemplates a system which reacts to identified drift in some manner. For example, after a drift threshold has been reached, the system may activate either an audible or a visual alarm alerting a system user that unacceptable drift has occurred or that drift is approaching an unacceptable level. Alternatively, the system may automatically notify a system technician that recalibration should be performed.

Furthermore, the invention contemplates an apparatus and a method for adjusting PMT gains to compensate for drift. For example, assume a PMT has drifted 5% higher, in this case PMT gain can be automatically reduced by an amount calculated to compensate for the drift.

Objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 8 is similar to FIG. 6, albeit showing combined upper and lower count rates for each PMT surface area;

FIG. 9 is similar to FIG. 6, albeit showing the difference between the upper and lower count rates;

FIG. 10 is similar to FIG. 6, albeit showing normalized differences of FIG. 9;

FIG. 11 is similar to FIG. 6, albeit showing gain errors for each PMT surface area;

FIG. 12 is similar to FIG. 6, albeit showing compensating changes to an external gain factor for each PMT;

FIG. 13 is similar to FIG. 6, albeit showing new external gain factors; and

DETAILED DESCRIPTION OF THE INVENTION

A. Hardware Configuration

Figure 1:
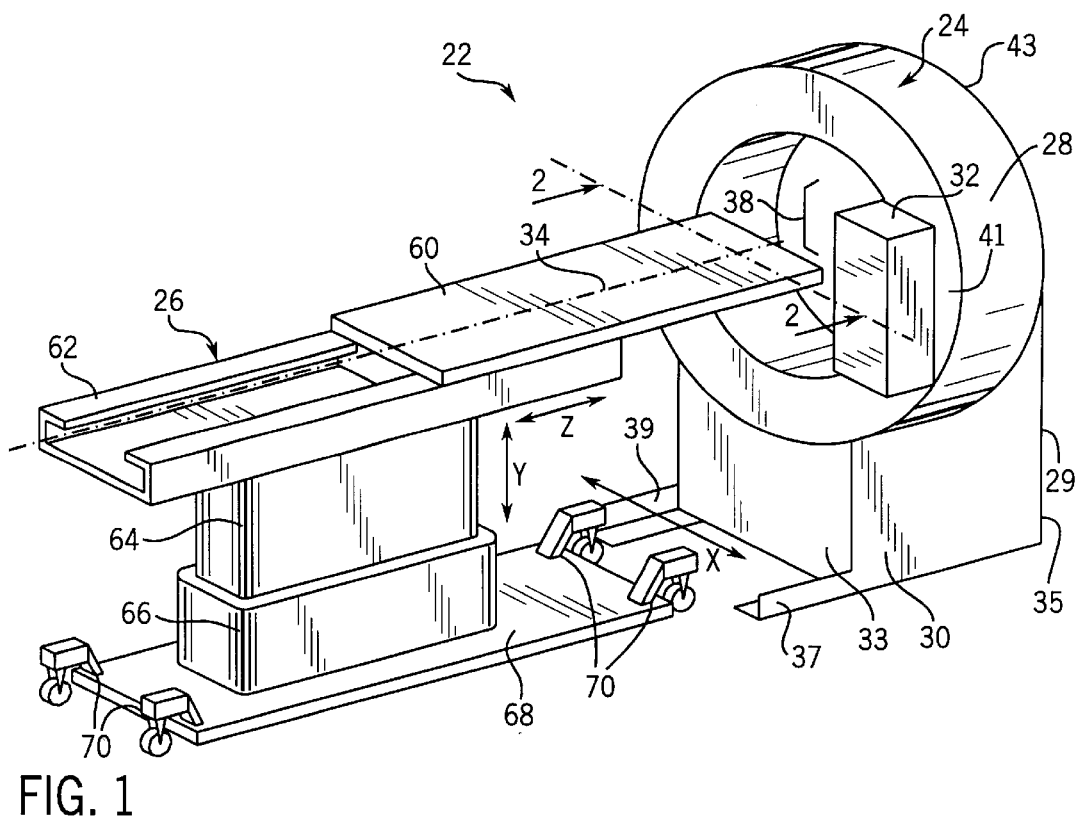
FIG. 1 is a perspective view of a gamma camera imaging system.

Referring now to the drawings, wherein like reference numerals represent corresponding elements throughout the several views, and more specifically, referring to FIG. 1, there is shown, generally at 22, an imaging system including a tomography machine 24 and a patient support table 26.

Table 26 includes a top surface 60 interleaved to a lower bracket member 62 which allows supported movement of the top surface 60 along a horizontal Z-axis. Member 62 is supported by a vertical leg 64 which extends upwardly from a collar 66. The length of leg 64 can be increased or decreased to raise or lower top surface 60 along a vertical Y-axis. Collar 66 is secured to a planar dolly 68 having four wheels collectively identified by the numeral 70, one wheel 70 attached at each of four corners. The wheels 70 allow an operator to move the entire table 26 laterally along an X-axis or along the Z-axis. Thus, table 26 allows an operator to move top surface 60 and a patient thereon within a range of three dimensional space.

Tomography machine 24 includes a pedestal 30, a gantry 28 and one planar gamma camera 32. Pedestal 30 has a front end 33 and a back end 35 and includes two stabilizing legs 37, 39 which extend forward from the front end 33, distal ends of the legs 37, 39 contacting a ground surface in front of the pedestal 30 to stabilize the pedestal front end 33 as the tomography machine 24 is generally front end heavy. The top surface of the pedestal 30 is generally shaped concavely upward so as to receive an outer surface of gantry 28. In addition, although not shown, the pedestal 30 may also house a gantry motor for rotating the gantry 28 about a central gantry rotation axis 34.

Gantry 28 is generally doughnut shaped about axis 34. Pedestal 30 supports gantry 28 in an upright vertical orientation so that its rotation axis 34 is horizontal and can be parallel to the support table Z-axis. Gantry 28, like pedestal 30, has a front end and a back end defined by front and back surface 41 and 43, respectively. The gantry 28 can rotate about central rotation axis 34.

Figure 2:
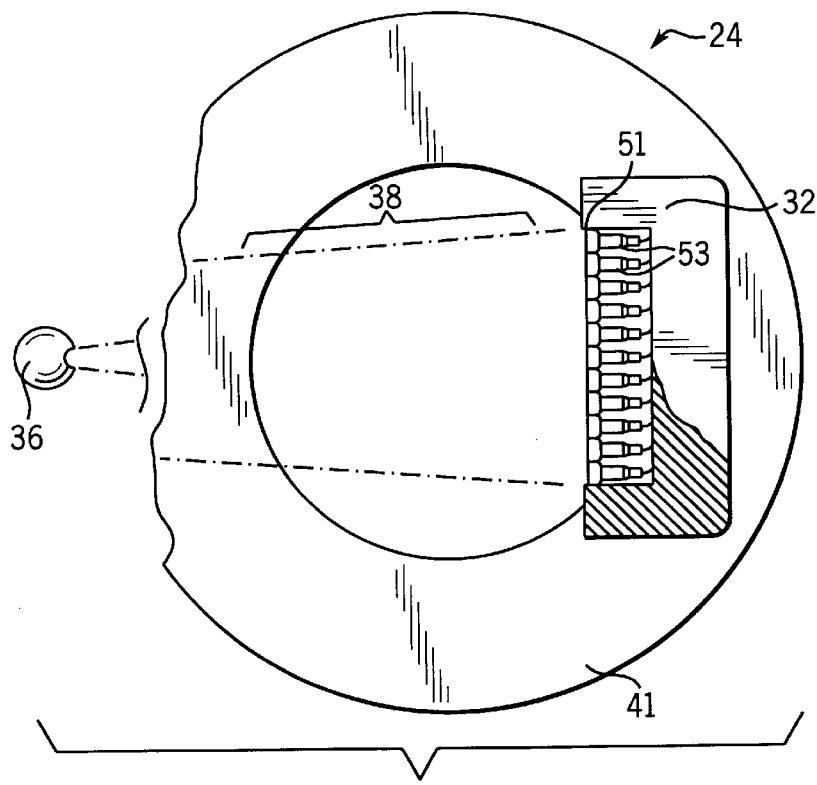
FIG. 2 is a front plan view of the system of FIG. 1 in partial cross section.
Figure 3:
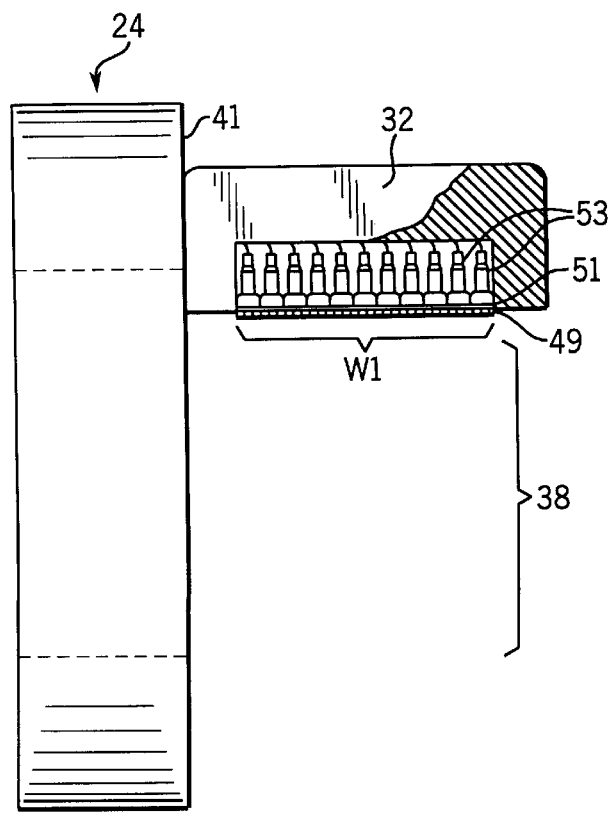
FIG. 3 is a top plan view of the system of FIG. 1 in partial cross section.

Referring to FIGS. 1, 2 and 3, camera 32 is mounted securely to the front surface 41 of gantry 28 so that when gantry 28 rotates about axis 34, camera 32 likewise rotates. Camera 32 is mounted so that it faces an imaging area 38 and axis 34.

Among other things camera 32 includes a collimator 49 (not illustrated in FIG. 2), a scintillation crystal 51 and a plurality of PMTs collectively referred to by numeral 53. Collimator 49 is preferably a lead block which forms a large number of small parallel apertures, the apertures passing through collimator 49 perpendicular to a collimator width W1 (see FIG. 3) and length (not illustrated) perpendicular to width W1. The apertures together form preferred photon flight paths through collimator 49 blocking photons which travel along non-preferred flight paths.

Crystal 51 is a planar member having length L1 and width W1 dimensions. Crystal 51 has two oppositely facing sides or surfaces including an impact surface (not numbered) and an emitter surface (also not numbered). When camera 32 is assembled, the impact surface is adjacent and faces collimator 49 and the emitter surface faces away from collimator 49. Photons which pass through collimator 49 impact the impact surface at specific impact points and are absorbed by crystal 51.

Figures 6, 7:
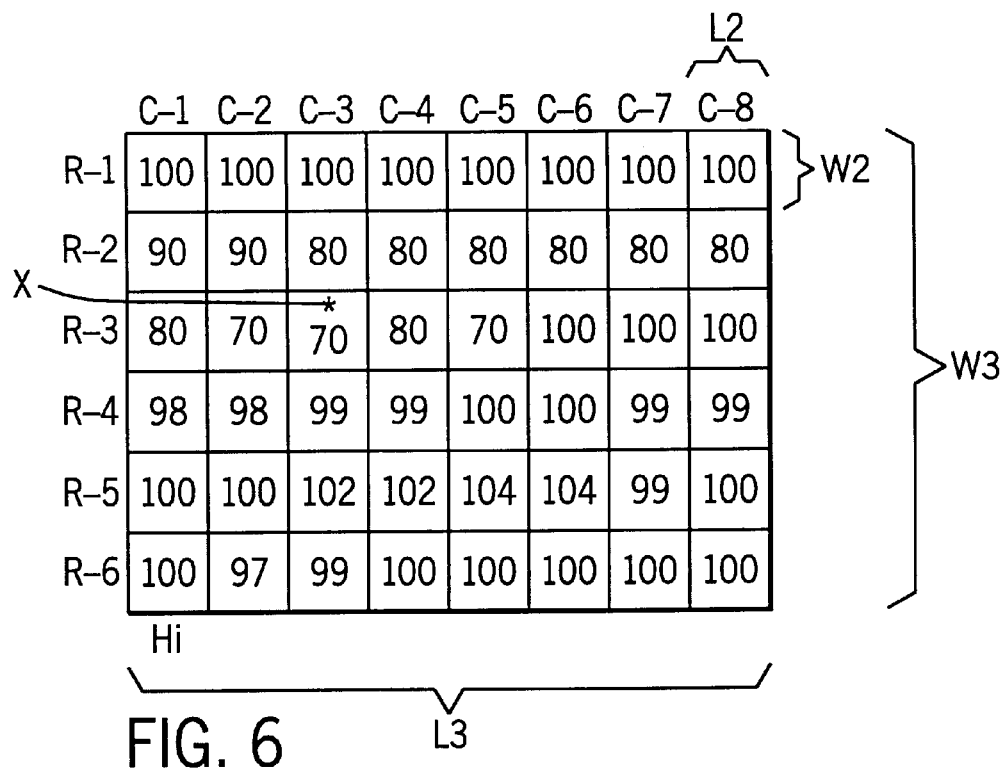
FIG. 6 is a schematic representation of an array of PMT surface areas indicating an exemplary upper image count rate.
FIG. 7 is similar to FIG. 6 albeit indicating an exemplary lower image count rate.

Referring to FIGS. 2, 3 and 6, while in reality most PMTs define circular detector areas, in the interest of simplifying this explanation, it will be assumed that each PMT 53 defines a square surface area A having a length L2 and a width W2. PMTs 53 are arranged along their lengths L2 and widths W2 to form a detector array 55 having eight columns C-1 though C-8 along detector length L3 and six rows R-1 through R-6 along detector width W3. Length L3 is essentially equal to or slightly greater than the collimator length while width W3 is essentially equal to or slightly greater than width W1. Hereafter, separate PMTs 53 in array 55 will be referred to by column and row number. For example, the PMT in column C-3, row R-3 will be referred to as PMT 3-3.

Array 55 is arranged parallel and adjacent crystal 51 on the emitter side opposite collimator 49. Thus, when crystal 51 emits light, the light is directed toward array 55. PMTs 53 each absorb light emitted by crystal 51 and generate intensity signals indicating the quantum of light detected.

When a photon passes through collimator 49 and impacts crystal 51 at an impact point, the photon is absorbed by the crystal 51. When a photon is absorbed, crystal 51 generates and emits light from an emitter point on the crystal's surface adjacent the impact point. The amount of light emitted is proportional to the energy of the absorbed photon, higher energy photons generating more light than lower energy photons. Emitted light is detected by PMTs 53. While the majority of emitted light caused by an absorbed photon is detected by the PMT 53 adjacent the emitter point, some light is detected by each of a plurality of PMTs within a PMT "neighborhood" around the emitter point. For example, referring to FIG. 6, an emitter point is identified by the letter "X" adjacent PMT 3-3. While most light emitted from point X will be detected by PMT 3-3, some light will be detected by each of PMTs 2-2, 2-3, 2-4, 3-2, 3-4, 4-2, 4-3 and 4-4. In addition, some small quantum which is often negligible will be detected by other PMTs 53 within array 55.

Figure 4:
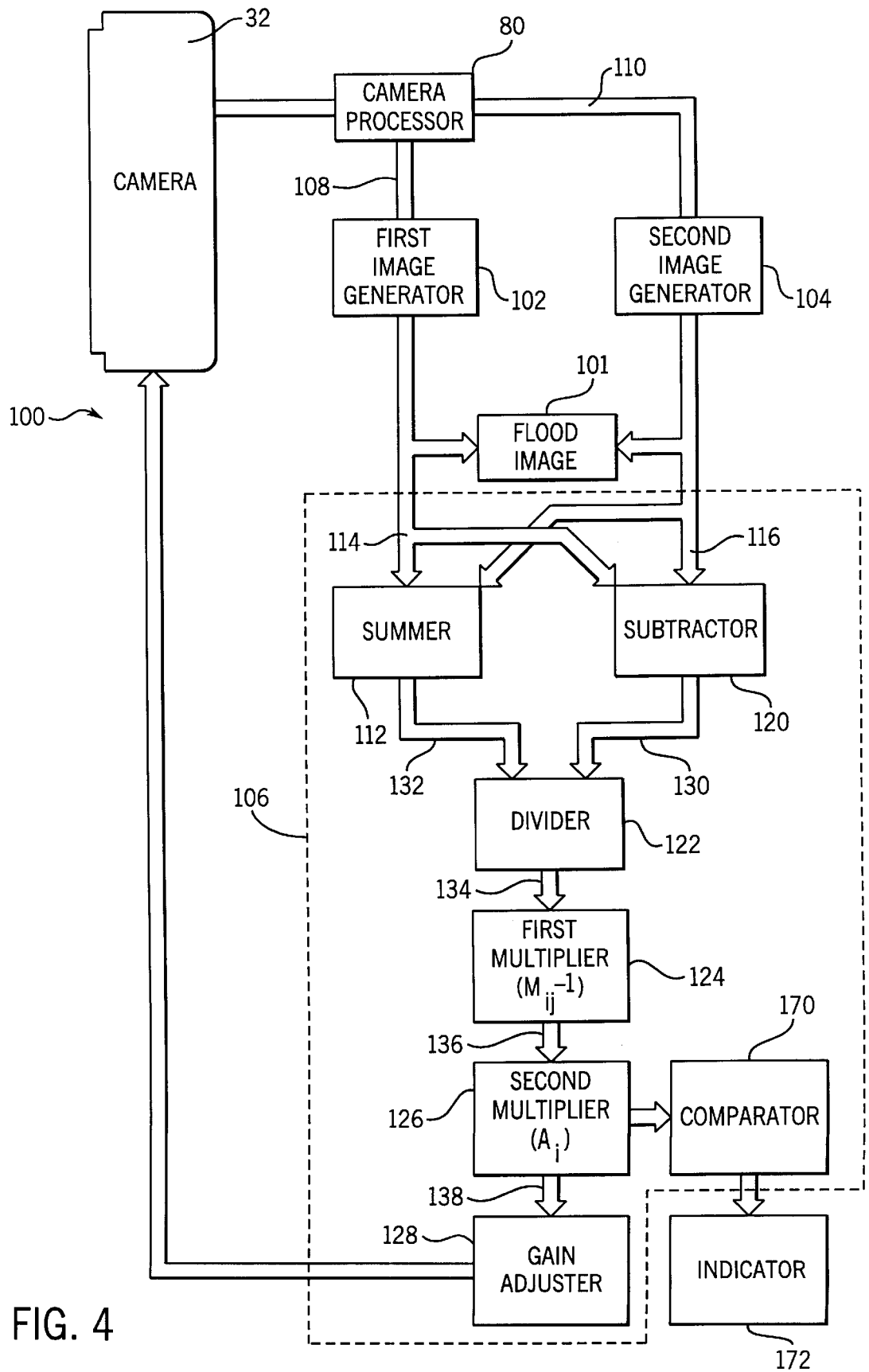
FIG. 4 is a block diagram of an apparatus according to the present invention which is used with the system of FIG. 1.

When each of PMTs 2-2, 2-3, 2-4, 3-2, 3-3, 3-4, 4-2, 4-3 and 4-4 detects light, each PMT generates an intensity signal proportional to the light detected. Referring also to FIG. 4, a camera processor 80 is linked to camera 32 and receives all intensity signals from all PMTs 53.

To determine the energy level of an absorbed photon, processor 80 adds up all PMT intensity signals caused by the absorbed photon generating an event intensity signal which can be used along with a lookup table or the like to determine photon energy.

To determine photon impact point, processor 80 can use any of several different methods which are well known in the art. For example, for each absorbed photon, most methods first determine which PMT intensity signal is the largest and identify the corresponding PMT as the PMT closest to the impact point, the closest PMT referred to herein as the event PMT. To determine where the impact point is on the event PMT surface area, most methods compare intensity signals generated by PMTs within the event PMT neighborhood. For example, referring again to FIG. 6, where PMT 2-3 generates a greater intensity signal than PMT 4-3, the impact point is closer to PMT 2-3 than to PMT 4-3. In this manner PMT intensity signals can be used to determine both photon intensity and impact point.

Referring again to FIGS. 1 and 4, according to the present invention, system 24 also includes an apparatus 100 for identifying and compensating for PMT drift. To this end, apparatus 100 generally includes first and second image generators 102, 104, a flood image generator 101 and a processor 106. First and second generators 102 and 104 are linked via data buses 108 and 110, respectively, to processor 80 and receive event signals therefrom. Each event signal indicates both photon energy and impact point of an absorbed photon. Generators 102 and 104 each select a subset of the event signals and generate upper and lower images corresponding to the subsets. Preferably, the subset selected by generator 102 includes event signals corresponding to photons having energies within the upper half of an acquisition range of energy levels. Similarly, the subset selected by generator 104 includes event signals corresponding to photons having energies within the lower half of the acquisition range. The upper and lower images are provided on buses 114 and 116.

Generator 101 receives the upper and lower images via buses 114 and 116 and effectively adds the images to generate a flood image on bus 118. Bus 118 can be linked to either another processor for automatic quantitative analysis or can be linked to a human interface device (e.g. image quality CRT) for technician examination.

Processor 106 receives the upper and lower images and compares the upper and lower images to identify PMT drift and then compensates for identified drift. To this end, processor 106 includes a summer 112, a subtractor 120, a divider 112, a first multiplier 124, a second multiplier 126 and a gain adjuster 128. Summer 112 identifies a plurality of regions of interest ROI on scintillation crystal 51, one ROI for each PMT 53. Typically an ROI will be the same size as the detector surface area of a PMT and will include the portion of crystal 51 which is adjacent the PMT's surface area. In the alternative, the ROI might be larger or smaller than a PMT's surface area. Where each ROI is different than a PMT's surface area, each ROI is typically centered with respect to a corresponding PMT surface area.

Once each ROI has been identified, summer 112 determines the number of events which occurred in each PMT ROI in the upper image and the number of events which occurred in each PMT ROI in the lower image and sums the events from both the upper and lower images which occur in the same ROI. For example, referring also to FIG. 6, assuming the ROI for PMT 3-3 is the PMT surface area, if 97 events occurred within the ROI in the upper image and 104 events occurred within the ROI in the lower image, summer 112 would yield a total number of events 201 for PMT 3-3. The total number of events for each PMT is provided on bus 132 to divider 122.

Subtractor 120, like summer 112, receives the upper and lower images via buses 114,116, respectively, identifies the number of events in each PMT ROI in the upper image and identifies the number of events in each PMT ROI in the lower image. However, instead of adding events which occur in the same ROI, subtractor 120 subtracts the number of events which occur in ROIs in the lower image from the number of events which occur in the same ROIs in the upper image. For example, where the number of events in PMT 3-3's ROI in the upper image was 97 and the number in the lower image ROI was 104, subtractor 120 yields −7 as the difference in event numbers. The number difference for each PMT is provided on bus 130 to divider 122.

Divider 122 divides the difference number for each PMT by the total event number for the PMT generating a normalized difference value for each PMT which is provided on bus 134. Together, the normalized difference values form a difference matrix.

Multiplier 124 includes a matrix $M_{ij}^{-1}$ which is the inverse of an interactions matrix $M_{ij}$ wherein interactions matrix $M_{ij}$ describes how energy measured over a particular PMT is affected by gains of surrounding PMTs. For example, if the actual gain errors in the tubes can be described as a vector $DN_i$ and measured errors as $MG_i$, the relationship between $DN_i$ and $MG_i$ is given by:

$$MG_i M_{ij} DN_j \qquad \text{Eq. 1}$$

The matrix $M_{ij}$ can be obtained by taking a camera in which all the PMT gains have been adjusted appropriately, and modifying the gain of PMTs one at a time by a small amount (e.g. 5%). The resulting measurement of gain shift on all PMTs for a single PMT gain modification generate one column of the matrix $M_{ij}$. The process is repeated for each PMT in turn, yielding the complete matrix $M_{ij}$. Each column of matrix $M_{ij}$ is then normalized to one. It should be obvious to one skilled in the art that such a matrix equation can be mathematically inverted, resulting in an equation relating the measured gain error on each PMT to the actual gain error. This can be written as:

$$DN_i M_{ij}^{-1} MG_j \qquad \text{Eq. 2}$$

Vector $DN_i$ is a good approximation of a non-interacting normalized ratio of drift error for a corresponding PMT. Equation 2 (the coefficients of which need only be determined once for a particular camera type) is solved by multiplier 124 which provides the result on bus 136. If no coefficients are known matrix $M_{ij}$ can be assumed to be equal to the identity matrix. This will cause some degradation of the accuracy of the drift determination, but will not invalidate the method. Vector $DN_i$ can be converted to an actual gain error accounting for interaction between PMTs by multiplying vector $DN_i$ by an algorithm gain factor $A_i$. Typical factors $A_i$ are approximately 0.1.

Because there will be some noise in the measurement of PMT drift (e.g. even for perfectly adjusted PMTs there will never be identical count densities in the upper and lower images) the drift error will almost never be exact. Thus, if a full adjustment for error $DN_iA_i$ is performed, another error will often occur during the next iteration. In other words, the adjustment can overshoot the correct value and result in oscillatory corrections. To avoid oscillatory corrections, drift error $DN_iA_i$ can be damped using a damping factor $F_i$. A value of damping factor $F_i$ of 0.6 to 0.8 causes appropriate damping with reasonable convergence of the algorithm. Multiplier 126 multiples each vector $DN_iA_i$ by factor $F_i$ providing an adjusted error vector $G_{error}$ on bus 138.

Gain adjuster 128 uses vectors $G_{error}$ to adjust PMT external gain factors Ge, one gain factor for each PMT 53. Adjuster 138 adjusts factors Ge according to the following equation:

$$Ge' = Ge - (G_{error} * Ge) \qquad \text{Eq. 3}$$

where Ge' is an adjusted gain factor. For example, if vector $G_{error}$ indicates an error of −0.3% for PMT 3-3 (see FIG. 6) and the current gain factor Ge is 2000, factor Ge' is adjusted according to Equation 3 to be 2006.

B. Operation

Referring to FIGS. 1, 2 and 4, in operation, during an on-peak acquisition flood procedure with nothing (i.e. collimator 49 of FIG. 3 is removed) in imaging area 38, a point radiation source 36 (see FIG. 2) having an energy level Z is positioned at a distance from camera 32 and is directed at camera 32 so that radiation detected by camera 32 is essentially uniform. Energy level Z is maintained constant so that, during the flood procedure, essentially identical numbers of photons within an acquisition energy level range about energy level Z impact crystal 51 adjacent each PMT 53.

PMTs 53 detect light caused by photons absorbed by crystal 51 and generate intensity signals provided to processor 80. Processor 80 uses the intensity signals to generate event signals indicating both photon intensity and photon impact position.

For the purpose of this explanation it will be assumed that the acquisition range is a 20% on-peak acquisition. In this case, processor 80 selects only events corresponding to the 20% on-peak acquisition range and provides only the selected event signals to both image generators 102 and 104. Generator 102 generates an upper image using all event signals corresponding to photons having energies within the upper half of the 20% on-peak acquisition range while generator 104 generates the lower image using only event signals corresponding to photons having energies within the lower half of the acquisition range. In other words, given a 20% on-peak acquisition, the upper image is generated using event signals corresponding to photons having energies between energy levels Z and 1.1Z while the lower image is generated using event signals corresponding to photons having energies between levels 0.9Z and Z.

In the interest of simplifying this explanation, because processor 106 performs essentially the same procedure for each PMT to determine drift, the procedure will only be described with respect to PMT 3-3. In addition, it will be assumed that when PMT gain is ideal so that either no drift occurs or drift is correctly compensated for, during a flood procedure identical numbers of events occur in PMT 3-3's ROI in each of the upper and lower images. Moreover, it will be assumed that the number of events which should occur in the ROI in the upper image is 100. Similarly, the number of events which should occur in the ROI in the lower image should be 100.

Figure 5:
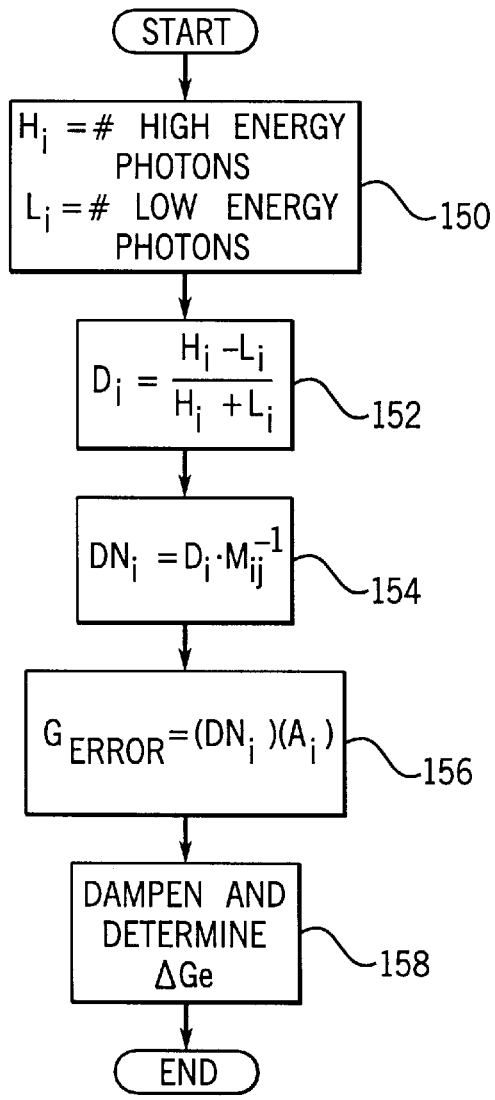
FIG. 5 is a flow chart illustrating an inventive method for identifying PMT drift.

With respect to PMT 3-3, summer 112 receives the upper and lower images and identifies the ROI for PMT 3-3 in each of the images. Next referring also to FIG. 5, where a method for identifying and compensating for drift is illustrated, summer 112 determines the quantity of photons $H_i$ in the upper image ROI and determines the quantity of photons $L_i$ in the lower image ROI at process step 150. Referring also to FIG. 6, exemplary event quantities $H_i$ corresponding to each PMT ROI in array 55 are illustrated. Similarly, referring also to FIG. 7, exemplary event quantities $L_i$ for each PMT ROI are illustrated. Note that some quantities $H_i$ are higher than the ideal quantity (e.g. >100) indicating that an associated PMT has drifted higher while some quantities $H_i$ are lower (e.g. <100) indicating that an associated PMT has drifted lower. In the present example, PMT 3-3 has drifted lower having a quantity $H_i$ of 70 and a quantity of $L_i$ of 140.

At step 152, summer 112 adds quantities $H_i$ and $L_i$ indicating the total quantity of photons in the ROI's of both the upper and lower images. The sum quantities $(H_i + L_i)$ for each PMT ROI is array 55 are illustrated in FIG. 8. For PMT 3-3 the sum quantity is 200.

In addition, at step 152 subtractor 120 subtracts quantity $L_i$ from quantity $H_i$ for each PMT. Difference quantities $(H_i - L_i)$ for each PMT ROI in array 55 are illustrated in FIG. 9. For PMT 3-3 the difference quantity is −60.

Moreover, at block 152, divider 122 divides the difference quantity for each PMT by the sum quantity for the PMT generating a normalized difference vector $D_i$ for each PMT. The normalized difference vectors for all PMTs in array 55 are illustrated in FIG. 10. For PMT 3-3 vector $D_i$ is −0.30.

At block 154 multiplier 124 multiplies vectors $D_i$ by matrix $M_{ij}^{-1}$ to eliminate the effects of other PMTs on value $D_i$ generating a vector $DN_i$ for each PMT. While this step would usually render values $DN_i$ which are different than corresponding values $D_i$, to simplify this explanation it will be assumed that this step yields vectors $DN_i$ which are essentially identical to vectors $D_i$. The resulting values $DN_i$ are not illustrated but are reflected in FIGS. 11 through 13.

At block 156 multiplier 126 multiplies algorithm factor $A_i$ by each vector $DN_i$ generating actual gain error $G_{error}$. Assuming factor $A_i$ is 0.10, the gain error $G_{error}$ for PMT 3-3 is −0.030. Next, at step 158, each vector $DN_iA_i$ is multiplied by damping factor $F_i$. Assuming damping factor $F_i$ is 0.6, the damped gain error for each PMT in array 55 is illustrated in FIG. 11. For PMT 3-3, the gain error is −0.018.

Also, at step 158, adjuster 128 determines a gain adjustment $\Delta G_e$ which is a function of error $G_{error}$. How adjustment $\Delta G_e$ is related to error $G_{error}$ is system dependent and may be linear or related by some other function. Here it will be assumed that adjustment $\Delta G_e$ and error $G_{error}$ are linearly related. The adjustment $\Delta G_e$ for each PMT will be error $G_{error}$ multiplied by the initial gain $G_e$ (see Equation 2). Assuming an initial gain $G_e$ of 2000, adjustments $\Delta G_e$ for each PMT in array 55 are illustrated in FIG. 12. For PMT 3-3, adjustment $\Delta G_e$ is −36. New gains according to Equation 2 for each PMT are illustrated in FIG. 13. For PMT 3-3 the new gain is indicating that the overall gain $G_i \times G_e$ must be increased to compensate for drift (i.e. $G_e - \Delta G_e$).

After the gains have been modified, during imaging or during the next flood procedure, gains $G_e$ at least partially compensate internal PMT drift causing reduced error and resulting in better images.

Figure 14:
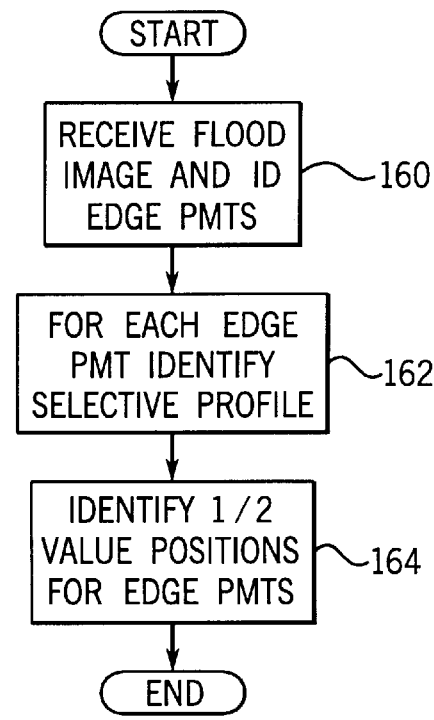
FIG. 14 is a flow chart illustrating a method for identifying gain drift of edge PMTs.

The above described general method to identify drift works well with non-edge PMTs 53 and will work properly with edge PMTs (i.e. PMTs on the edges of array 55) in most cases. However, as is the case in many configurations, collimator 49 might be smaller than the PMT array field of view FOV. In this case, referring to FIGS. 2, 3 and 6, width W1 and length L1 might be smaller than width W3 and Length L3 such that one or two PMT edges are clipped. Here it is impossible to get an accurate estimate of the gain of edge PMTs without some special method. A preferred method for identifying gain drift in edge PMTs is illustrated in FIG. 14. Processor 80 can be used to perform the method.

Referring to FIGS. 4 and 14, during an initial camera tuning, without using a digital FOV mask, after a flood image has been generated, processor 80 receives the flood image at step 160. For each edge PMT 53, processor 80 determines the position of the edge of the collimated FOV by, at step 162, taking a selective profile through the edge of the image in the vicinity of the PMT 53. For example, the FOV edge may be estimated to within 1 inch and the selective profile would be taken within that inch.

Next, at block 164 processor 80 compares intensities across the profile for each PMT to determine a first position within the intensity profile at which intensity level has dropped to half the intensity at the center of the image. The half value intensity is referred to herein as the midpoint intensity. The half value position is stored as the FOV edge.

During a subsequent quality control flood procedure, after the flood image is generated, the process of FIG. 14 is again performed to identify a second position of the FOV edge for each edge PMT. Then processor 80 performs the additional step (not illustrated) of comparing the FOV edge during the initial tuning procedure to the FOV during the subsequent procedure. If the edge has moved out further, the relevant PMT gain has gone up and needs to be compensated. However, if the edge has moved in, the relevant PMT gain has gone down and needs to be increased.

C. Other Embodiments

It should be understood that the methods and apparatuses described above are only exemplary and do not limit the scope of the invention, and that various modifications could be made by those skilled in the art that would fall under the scope of the invention.

Referring again to FIG. 4, processor 106 may also include a comparator 170 which receives each error adjustment $\Delta G_e$ from multiplier 126 and compares each adjustment to an acceptable adjustment level $\Delta G_a$. Where an adjustment $\Delta G_e$ exceeds acceptable level $\Delta G_a$, comparator 170 may generate and provide an alarm signal to an indicator 172 indicating that a relatively large gain change has been made. Indicator 172 may take many different forms such as an audio or visual alarm or an electronic indicator such as an e-mail or a facsimile to a technician.

In addition, while factor $A_i$ may be set to a constant (e.g. 0.10), the invention contemplates a system wherein factor $A_i$ might be adjustable as a function of how the system responds to a gain modification. For example, if a gain modification results in a large corrective overshoot, factor $A_i$ might be reduced during a subsequent adjustment procedure.

Moreover, while gain $G_e$ is described above as being modified immediately after PMT drift is identified, gain $G_e$ might instead be modified just prior to a subsequent quality control procedure. This is because the flood image used by a technician will be a pre-gain adjustment image. If a technician relies on the pre-gain adjustment image during diagnostics, gain modifications are unaccounted for. Thus, after imaging and immediately prior to the next quality control procedure gains $G_e$ should be adjusted so that gain $G_e$ adjustments are made and show up during the next flood procedure.

Furthermore, while the invention is described in the context of a 20% on-peak flood acquisition, clearly, the invention contemplates other on-peak acquisition ranges. Thus, where an acquisition range is between energy levels X and Y, a first or lower image could be generated using events having energies between X and C where C is greater than X and less than Y and a second or upper image could be generated using events having energies between D and Y where D is greater than X and less than Y. C may be greater than or less than D but preferably is equal to D and C and D are both Z where Z is $(X+Y)/2$.

Moreover, while an intrinsic point source 36 is described as the source of flood radiation, clearly other flood sources (i.e. a collimated extrinsic sheet source) could be employed to generate the flood flux.

To apprise the public of the scope of this invention, I make the following claims:

I claim:

1. A method for identifying PMT drift in an edge PMT of a gamma camera wherein the camera includes a plurality of PMTs arranged in an array, the array including a central point at which, during a flood procedure, an intensity signal having intensity M is generated, a field of view FOV edge blocking at least a portion of the edge PMT, the PMT including a center point and at least one dimension over which the PMT intensity profile changes due to the blocked PMT portion, during an initial flood procedure, the PMT intensity profile including a first point at which the intensity level is N where N is a fraction of M, the method comprising the steps of, during a subsequent flood procedure:

generating an updated intensity profile for the PMT;

determining a second point on the second intensity profile at which the intensity level is N;

comparing the first and second points:

(a) where the second point is further from the center point than the first point, indicating that the PMT gain is too high; and (b) where the second point is closer to the center point than the first point, indicating that the PMT gain is too low.

2. The method of claim 1 wherein N is M/2.

3. The method claim 1 wherein the indication of gain error is used to make an adjustment to the gain of edge PMTs.

* * * * *